United States Patent
Wozniak

(10) Patent No.: US 11,407,690 B2
(45) Date of Patent: Aug. 9, 2022

(54) PLANT FERTILIZER COMPOSITIONS AND RELATED METHODS

(71) Applicant: CYTOZYME LABORATORIES, INC., Salt Lake City, UT (US)

(72) Inventor: Elizabeth Maria Wozniak, Sandy, UT (US)

(73) Assignee: Cytozyme Laboratories, Inc., Salt Lake City, UT (US)

( * ) Notice: Subject to any disclaimer, the term of this patent is extended or adjusted under 35 U.S.C. 154(b) by 0 days.

(21) Appl. No.: 16/835,295

(22) Filed: Mar. 30, 2020

(65) Prior Publication Data

US 2020/0308074 A1 Oct. 1, 2020

Related U.S. Application Data

(60) Provisional application No. 62/826,817, filed on Mar. 29, 2019.

(51) Int. Cl.

| | |
|---|---|
| *C05G 1/00* | (2006.01) |
| *C05F 11/08* | (2006.01) |
| *C05F 17/40* | (2020.01) |
| *C05B 17/00* | (2006.01) |
| *A01C 21/00* | (2006.01) |
| *C05C 11/00* | (2006.01) |
| *C05D 1/00* | (2006.01) |
| *C05G 5/12* | (2020.01) |
| *C05B 19/00* | (2006.01) |

(52) U.S. Cl.
CPC .............. *C05G 1/00* (2013.01); *A01C 21/00* (2013.01); *C05B 17/00* (2013.01); *C05B 19/00* (2013.01); *C05C 11/00* (2013.01); *C05D 1/005* (2013.01); *C05F 11/08* (2013.01); *C05F 17/40* (2020.01); *C05G 5/12* (2020.02)

(58) Field of Classification Search
None
See application file for complete search history.

(56) References Cited

U.S. PATENT DOCUMENTS

| | | | |
|---|---|---|---|
| 2007/0131009 A1* | 6/2007 | Westbrook .............. | C05F 11/08 71/6 |
| 2016/0100587 A1* | 4/2016 | Bywater-Ekegard ... | C05F 11/00 504/101 |
| 2017/0197890 A1* | 7/2017 | Jacobson ............... | C05D 1/005 |
| 2018/0223246 A1* | 8/2018 | Shinde .................... | A01N 65/03 |
| 2019/0014788 A1* | 1/2019 | Sawant .................... | A01N 65/20 |
| 2019/0174765 A1* | 6/2019 | Carney .................... | C12N 1/12 |
| 2019/0194600 A1* | 6/2019 | Alibek .................... | E21B 43/16 |
| 2019/0309248 A1* | 10/2019 | Alibek .................... | A01N 63/32 |
| 2020/0148605 A1* | 5/2020 | Burnham ................. | C05F 3/00 |
| 2020/0221705 A1* | 7/2020 | Harman .................. | C05G 5/12 |
| 2020/0255355 A1* | 8/2020 | Venkatramesh ......... | C05G 5/37 |

FOREIGN PATENT DOCUMENTS

WO WO 2018/129299 A1 * 7/2018 ............ A01N 63/02

* cited by examiner

*Primary Examiner* — Wayne A Langel

(74) *Attorney, Agent, or Firm* — Workman Nydegger

(57) ABSTRACT

Plant fertilizer compositions, products, systems, kits, and methods. Products and methods for increasing the amount of soluble phosphorus in soil, solubilizing or increasing the level of soluble phosphorus and/or bioavailability of phosphorus in soil. Bioactivated fertilizer compositions and related methods for increasing phosphorus solubility and/or bioavailability in soil.

20 Claims, No Drawings

PLANT FERTILIZER COMPOSITIONS AND RELATED METHODS

BACKGROUND

1. Technical Field

The present disclosure relates generally to increasing the amount of soluble phosphorus in soil, and more particularly to compositions and methods for solubilizing or increasing the level of soluble phosphorus and/or bioavailability of phosphorus in soil. Specifically, the present disclosure relates to bioactivated fertilizer compositions and related methods for increasing phosphorus solubility and/or bioavailability in soil.

2. Related Technology

Phosphorus is one of the primary nutrients required by plants for robust growth. Soil may contain a basal level or amount of phosphorus. Some soils may be deficient in phosphorus. Plants grown in phosphorus-deficient soil may not thrive and/or may die prematurely. Various fertilizer compositions, including bi-blend fertilizers (e.g., nitrogen-phosphorus (NP), phosphorus-potassium (PK, etc.) and tri-blend fertilizers (e.g., nitrogen-phosphorus-potassium (NPK), etc.), include phosphorus or a source of phosphorus (e.g., in the form of $P_2O_5$). Fertilizers may be useful in increasing the amount or level of phosphorus in the soil.

Phosphorus contained in or applied to soil is not necessarily bio-available for use by plants growing in the soil. For instance, phosphorus (or source(s) of phosphorus) disposed in and/or applied to soil, such as from fertilizers, may not be soluble or otherwise available for plant uptake or utilization. In particular, phosphorus may react with and/or be or become bound to soil components in a manner that reduces, inhibits, or prevents its solubility. Such soil component-bound forms of phosphorus may need to be (re-)solubilized or converted to soluble form before they can be taken up, used, and/or bio-available to plants.

Conversion of $P_2O_5$ and/or other forms or sources of phosphorus to soluble phosphorus can be slow, inefficient, and/or incomplete. Water, alone, may not be sufficient to solubilize insoluble phosphorus disposed or contained in soil, such as phosphorus bound to soil components. Phosphorus from fertilizers applied to the soil may become bound to soil components or otherwise insoluble before a plant can take up or use the phosphorus, which may reduce the effectiveness of the applied phosphorus. Accordingly, a considerable amount of applied phosphorus may be wasted in that it is not utilized by plants.

Fertilizer overapplication may contaminate the environment and causes eutrophication of water supply. Excessive amounts of macronutrients used in agriculture, especially phosphorus and nitrogen, may result in leaching of these nutrients to the aquatic ecosystems leading to overgrowth of plants an algae. Once these organisms die, bacterial degradation of their biomass may result in oxygen consumption and formation of anaerobic conditions, which may kill aquatic life. Reduction of aquatic ecosystem eutrophication is necessary to keep water supply clean and maintain healthy environment.

Many plant or crop growers are sensitive to the ingredients or components in plant and soil treatment compositions. Organic and/or non-GMO farmers, for example, may refuse to apply synthetic chemicals or genetically modified materials to their plants. A suitable preferred composition, preferably a natural, organic, non-GMO, renewable, and/or "green" composition for enhancing the solubility and/or bioavailability of phosphorus in soil, in order to improve or enhance plant uptake of phosphorus (e.g., from phosphorus-containing fertilizers) is not known. Accordingly, there remains problems in the art to be addressed, particular in the area of reducing overuse of fertilizers and fertilizer components.

BRIEF SUMMARY

Embodiments of the present disclosure solve one or more of the foregoing or other problems in the art with products and methods for increasing the amount of soluble phosphorus in a plant growth medium (e.g., soil), and more particularly to compositions and methods for solubilizing or increasing the level of soluble phosphorus and/or bioavailability of (soluble) phosphorus in plant growth medium (e.g., soil). Some embodiments include products and methods for enhancing the uptake of soil-disposed phosphorus (e.g., delivered from fertilizer components). In particular, embodiments of the present disclosure include products and methods for increasing the solubility of phosphorus in soil and/or from fertilizer components. Specifically, embodiments of the present disclosure include soil treatment products and/or plant treatment products and methods of manufacturing and/or using the same (e.g., to enhance the health of plants).

Some embodiments relate to a soil treatment product and/or plant treatment product that includes (i) a source of phosphorus and (ii) one or more microbial fermentation products or components.

In some embodiments, the source of phosphorus can be or comprise one or more phosphorus-based (plant or soil) fertilizer component, or fertilizer component that includes phosphorus or a source of phosphorus. The one or more phosphorus-based plant fertilizer component, or fertilizer component that include phosphorus or a source of phosphorus, can be or comprise a phosphorus fertilizer (e.g., P), a bi-blend fertilizer comprising phosphorus and an additional fertilizer component, such as potassium or nitrogen (e.g., NP, PK), or a tri-blend fertilizer comprising phosphorus and two additional fertilizer components, such as potassium and nitrogen (e.g., NPK), a source of phosphorus (e.g., in the form of $P_2O_5$), a mineral source of phosphorus (e.g., rock dust or colloidal phosphate, also called "soft phosphate"), a salt form of phosphorus (e.g., ammonium phosphate, potassium phosphate, etc.) or an organic source of phosphate (e.g., animal product, animal byproduct, animal waste product, plant product, plant byproduct, plant waste product, microbial waste product, other waste product, etc.).

In some embodiments, the one or more microbial fermentation products or components can be or comprise one or more components of a microbial fermentation culture (e.g., a whole-culture lysate of a microbial fermentation culture). One or more additional products or components can be included in some embodiments. Some embodiments relate to methods of manufacturing the product. Some embodiments relate to methods of using the product. For instance, embodiments can include a method of fertilizing a plant or crop. Illustrative (crop fertilizing) methods can include the step of co-applying (or co-administering) the product or components thereof to a plant or crop.

An illustrative microbial fermentation product can include one or more components of a microbial fermentation (e.g., liquid suspension) culture. For instance, in some embodiments, the microbial fermentation product (or one or more components of a microbial fermentation culture) can include or comprise one or more components of a (liquid) fermentation medium. The fermentation medium can comprise a fermentation broth or one or more components of a fermentation broth. Illustratively, the fermentation medium can comprise an at least partial spend fermentation broth.

In some embodiments, the microbial fermentation product (or one or more components of a microbial fermentation (e.g., liquid suspension) culture) can include cellular material from one or more microorganisms. Illustratively, the cellular material can comprise cellular (e.g., molecular and/or structural) components of one or more microorganisms. For instances, the cellular material can comprise (one or more components of) cell wall, cell membrane, organelle, etc. (or components or fragments thereof). In one or more embodiments, the microbial fermentation product (or cellular material) can comprise lysed cells or microorganisms. In some embodiments, the microbial fermentation product (or cellular material) can comprise non-living microorganisms.

In some embodiments, the microbial fermentation product (or one or more components of a microbial fermentation (e.g., liquid suspension) culture) can include one or more anaerobic metabolic products of one or more microorganisms. The anaerobic metabolic products can comprise, for example, anaerobic metabolites (or metabolites produced anaerobically), fermentation metabolites, and so forth. In some embodiments, the anaerobic metabolites are or comprise anaerobic metabolites of (or that were produced by) said microorganism(s). In some embodiments, the anaerobic metabolites are or comprise anaerobic metabolites of (or that were produced by) said microorganism(s) prior to said microorganism(s) being killed, inactivated, or lysed. In some (alternative or additional) embodiments, the anaerobic metabolites are or comprise metabolites of (or that were produced by) living microorganism(s) of the microbial fermentation product.

In one or more embodiments, the microbial fermentation product (or one or more components of a microbial fermentation (e.g., liquid suspension) culture) can (also) include one or more aerobic metabolic products of one or more microorganisms. The (optional) aerobic metabolic products can comprise, for example, aerobic metabolites (or metabolites produced aerobically). In some embodiments, the aerobic metabolites are or comprise aerobic metabolites of (or that were produced by) said microorganism(s). In some embodiments, the aerobic metabolites are or comprise aerobic metabolites of (or that were produced by) said microorganism(s) prior to said microorganism(s) being killed, inactivated, or lysed. In some (alternative or additional) embodiments, the aerobic metabolites are or comprise aerobic metabolites of (or that were produced by) living microorganism(s) of the microbial fermentation product.

In a preferred embodiment, the microbial fermentation product can comprise a whole culture lysate of a microbial fermentation culture (i.e., a microbial fermentation whole culture lysate). The whole culture lysate of a microbial fermentation culture (or microbial fermentation whole culture lysate) can comprise (1) lysed microorganisms, or cellular material from one or more (lysed) microorganisms, (2) one or more anaerobic metabolic products of the one or more microorganisms (i.e., anaerobic or fermentation metabolites produced by the microorganisms (prior to being lysed), and (3) (liquid) fermentation medium or at least partially spent fermentation broth (in which the microorganisms were grown, growing, fermented, cultivated, etc. (prior to being lysed)). Optionally, the whole culture lysate of a microbial fermentation culture (or microbial fermentation whole culture lysate) can further comprise one or more aerobic metabolic products of the one or more microorganisms (i.e., aerobic metabolites produced by the microorganisms (prior to being lysed)).

In some embodiments, the microorganism(s) can be or include one or more genus, species, or strains of bacteria, preferably prokaryotic bacteria. In at least one embodiment, the bacteria can be or comprise one or more species or strain of lactic acid bacteria. In some embodiments, the one or more species or strain of lactic acid bacteria can include *Lactobacillus* (e.g., *acidophilus*, etc.), as described herein. In some embodiments, the microorganism(s) can include one or more (additional) microbial (e.g., bacterial) species and/or strains (e.g., other than a (first) microbial species or strain). For instance, in some embodiments, the microorganism(s) can include one or more (additional) lactic acid bacteria species and/or strains (e.g., other than the (first) lactic acid bacteria species or strain). In some embodiments, the microorganism(s) can include one or more non-lactic acid bacteria species and/or strains (e.g., other than the lactic acid bacteria species or strain).

Alternatively, or in addition, the cellular material can comprise cellular components or an extract of one or more fungus (e.g., yeast) and/or algae species or strains.

In certain embodiments, the microbial fermentation product, or microbial fermentation (e.g., liquid suspension) culture, can be substantially and/or entirely devoid of living microorganism of one or more variety. For instance, in some embodiments, the microbial fermentation product can comprise a whole culture lysate of a microbial suspension (fermentation) culture. Illustratively, a microbial fermentation (e.g., liquid suspension) culture, or microorganism(s) thereof, can be lysed, such that the microbial fermentation product, or microbial fermentation (e.g., liquid suspension) culture thereof, is substantially and/or entirely devoid of living microorganism. The microbial fermentation culture and/or lysate thereof can include a liquid medium (e.g., at least partially spent fermentation broth), lysed microbes (e.g., cellular material or components of one or more lysed microorganisms), and anaerobic (and, optionally, aerobic) metabolites of the (now lysed) microorganisms.

Certain embodiments can be substantially and/or entirely devoid of probiotics.

In some embodiments, the microbial fermentation product, or microbial fermentation (e.g., liquid suspension) culture (e.g., fermentation lysate) thereof can include or comprise one or more additives or additional components. Alternatively, or in addition, the soil treatment product or plant treatment product (which also comprises a phosphorus-containing fertilizer component) can include one or more additives or additional components. Regardless, the one or more additives or additional components can illustratively include, comprise, or be selected from: (1) amino acids, (2) peptides, (3) hydrolyzed proteins, (4) organic acids and/or carboxylic acids, (5) carbohydrates, (6) plant components or plant extracts (e.g., seaweed or soy components or extracts), (7) lignosulfonates, (8) humic acids and/or fulvic acids, (9) macro-nutrients, secondary-nutrients, and/or micro-nutrients, (10) chelated minerals and/or complex minerals, (11) vitamins, (12) wetting agents, (13) dispersants, and (14) surfactants. Some embodiments can include a mixture of two or more of the foregoing. Some embodiments can include a mixture amino acids, minerals, and organic acids. In some embodiments, the one or more additives can be included in the (active or live) culture (e.g., added to the lysate). In other embodiments, the one or more additives can be added to the soil treatment product or plant treatment product (or to a mixture of the microbial fermentation product and the (phosphorus-containing) fertilizer component).

In some embodiments, the microbial fermentation product can be in liquid or suspension form. In some embodiments, the microbial fermentation product can be in dry, substantially dry, or partially dry form. For example, in at least one embodiment, the microbial fermentation product can be applied, bound to, or mixed with a carrier or excipient. Illustratively, the carrier can comprise a naturally-occurring earth component, such as a phyllosilicate(s) or clay mineral(s).

In some embodiments, the microbial fermentation product in liquid form can be applied to the fertilizer component in dry form. For example, in at least one embodiment, the microbial fermentation product can be applied, bound to, or mixed with the fertilizer (e.g., do as to (at least partially or entirely) coat (at least some or a portion of) the fertilizer (or dry particles thereof). In some embodiments, the microbial fermentation product can be adsorbed to a surface of the fertilizer and/or absorbed below the surface of the fertilizer.

In at least one embodiment, the source of phosphorus can be or comprise a solid, granular, or powdered phosphorus-based plant fertilizer component (or fertilizer components that include phosphorus, such as an NPK fertilizer, etc.). Illustratively, the source of phosphorus can be (at least partially or entirely) coated with or by the microbial fermentation product or component (e.g., a (liquid) microbial fermentation (whole) culture lysate). In some embodiments, the source of phosphorus can be or comprise a liquid source of phosphorus, or liquid phosphorus-based plant fertilizer component (or liquid fertilizer components that include phosphorus, such as an NPK fertilizer, etc.) the liquid source of phosphorus can be mixed with the (liquid) microbial fermentation product or component (e.g., a microbial fermentation (whole) culture lysate) to form a liquid combination product.

In at least one (alternative) embodiment, the (liquid or solid form) source of phosphorus and the (liquid or solid form) microbial fermentation product can be separate products (e.g., comprise (separate) components of a kit). In some embodiments, the source of phosphorus and the microbial fermentation product can be applied separately and/or co-applied (to plant(s), soil or plant growth medium, seed(s), etc.).

At least one embodiment includes a method of producing a plant fertilizer product, the method comprising providing a plant fertilizer component and mixing the plant fertilizer component with the microbial fermentation product. An illustrative method of producing a soil treatment product or plant treatment product comprises combining a substantially liquid microbial fermentation product with a plant fertilizer component (e.g., at a ratio between about 1:1 and about 1:2000, fermentation product to plant fertilizer component, or vice versa, preferably at a ratio between about 1:500 and about 1:1000, fermentation product to plant fertilizer component, or vice versa) to form a soil treatment product or plant treatment product. One or more alternative or additional embodiments of producing a soil treatment product or plant treatment product comprises combining a substantially dry fermentation product (e.g., the fermentation product bound to a carrier) with a plant fertilizer component (e.g., at a ratio between about 1:1 and about 1:2000, fermentation product to plant fertilizer component, or vice versa, preferably at a ratio between about 1:500 and about 1:1000, fermentation product to plant fertilizer component, or vice versa) to form a soil treatment product or plant treatment product.

Some embodiments include a method of manufacturing a soil treatment product or plant treatment product. The method can include mixing a plant fertilizer component with a microbial fermentation product to form a soil treatment product or plant treatment product (or combination product). In some embodiments, a liquid plant fertilizer component is mixed with a liquid microbial fermentation product in a tank or mixer prior to product distribution. In one or more additional or alternative embodiments, a liquid plant fertilizer component and a liquid microbial fermentation product are co-formulated. Additional ingredients can be mixed with the plant fertilizer component, the microbial fermentation product, or mixture thereof.

In other embodiments, the method can include fluidly applying the microbial fermentation product to the fertilizer product.

In some embodiments, the soil treatment product or plant treatment product can comprise a kit or system that includes a plant fertilizer component and a microbial fermentation product. The kit or system can include instructions for mixing the plant fertilizer component and the microbial fermentation product for application to one or more plant or crop types. The kit or system can include instructions co-applying the plant fertilizer component and the microbial fermentation product to one or more plant or crop types.

Additional embodiments include a method of fertilizing and/or enhancing the health of one or more plants or crops. The method can include applying (i.e., administering) or co-applying an effective amount of a soil treatment product or plant treatment product (or components thereof) to a plant, preferably so as to improve one or more health indicators of the plant or plant population (e.g., as compared to a control). The one or more health indicators can be selected from the group consisting of wilting, coloration, yield, size and/or weight, life span and/or mortality, overall health and appearance, disease and/or disease effect (e.g., rot), and so forth.

Alternatively, the method can include applying (or co-applying) an effective amount of a soil treatment product or plant treatment product (or components thereof) to a seed (e.g., a group of seeds intended for sowing), preferably so as to improve one or more health indicators of the germinating seed and/or later-germinated plant or plant population (e.g., as compared to a control). The one or more health indicators can be selected from the group consisting of stronger germination, wilting, coloration, yield, size and/or weight, life span and/or mortality, overall health and appearance, disease and/or disease effect (e.g., rot), and so forth.

The step of applying (or administering) can comprise spraying and/or distributing a soil treatment product or plant treatment product (e.g., comprising, separately or a mixture of, the (phosphorus-based) plant fertilizer component and microbial fermentation product) on or near the plant, e.g., on the soil, such that the plant uptakes an effective amount of phosphorus from the soil treatment product or plant treatment product from the soil. The plant fertilizer component and microbial fermentation product can also be co-administered or co-applied (e.g., together, as a combination product, or separately). Soil fertilizer using the disclosed plant fertilizer product(s) can be performed prior to planting, prior to germination, after germination, and anytime during the life of the plant.

Products and methods of the present disclosure can result in an increased amount of soluble phosphorus in soil. The products and methods can be effective in solubilizing or increasing the level of soluble phosphorus and/or bioavailability of phosphorus in soil. The bioactivated fertilizer compositions and related methods can be effective for increasing phosphorus solubility and/or bioavailability in soil.

The inventive products and methods can further improve plant yield (for plants treated with, or grown in soil treated with the inventive products and methods). The inventive products and methods can further reduce the amount of fertilizer required to grow crops or plants, or to improve yield of said crops or plants. Such data being presented herein.

Additional features and advantages of illustrative embodiments of the present disclosure will be set forth in the description which follows, and in part will be obvious from the description, or may be learned by the practice of such illustrative embodiments. The features and advantages of such embodiments may be realized and obtained by means of the instruments and combinations particularly pointed out in the appended claims. These and other features will become more fully apparent from the following description and appended claims, or may be learned by the practice of such illustrative embodiments as set forth hereinafter.

DETAILED DESCRIPTION

Before describing various embodiments of the present disclosure in detail, it is to be understood that this disclosure is not limited to the specific parameters and description of the particularly exemplified systems, methods, and/or products that may vary from one embodiment to the next. It is also to be understood that much, if not all of the terminology used herein is only for the purpose of describing particular embodiments of the present disclosure, and is not necessarily intended to limit the scope of the disclosure in any particular manner. Thus, while certain embodiments of the present disclosure will be described in detail, with reference to specific configurations, parameters, features (e.g., ingredients, components, members, elements, parts, and/or portions), etc., the descriptions are illustrative and are not to be construed as limiting the scope of the present disclosure and/or the claimed invention. In addition, the terminology used herein is for the purpose of describing the embodiments, and is not necessarily intended to limit the scope of the present disclosure and/or the claimed invention.

Unless defined otherwise, all technical and scientific terms used herein have the same meaning as commonly understood by one of ordinary skill in the art to which the present disclosure pertains.

Various aspects of the present disclosure, including systems, methods, and/or products may be illustrated with reference to one or more embodiments, which are exemplary or illustrative in nature. As used herein, the term "embodiment" means "serving as an example, instance, or illustration," and should not necessarily be construed as preferred or advantageous over other aspects disclosed herein. In addition, reference to an embodiment is intended to provide an illustrative example without limiting the scope of the invention, which is indicated by the appended claims rather than by the description thereof. The terms "exemplary," "illustrative," and so forth can be used interchangeably and/or to make reference to one or more embodiments.

As used throughout this disclosure, the words "can" and "may" are used in a permissive sense (i.e., meaning having the potential to), rather than the mandatory sense (i.e., meaning must). Additionally, the terms "including," "having," "involving," "containing," "characterized by," variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

As used in this specification and the appended claims, the singular forms "a," "an" and "the" each contemplate, include, and specifically disclose both the singular and plural referents, unless the context clearly dictates otherwise. For example, reference to a "fertilizer" contemplates and specifically discloses one, as well as two or more fertilizers. Similarly, use of a plural referent does not necessarily require a plurality of such referents, but contemplates, includes, and specifically discloses one, as well as two or more of such referents, unless the context clearly dictates otherwise.

For the sake of brevity, the present disclosure may recite a list or range of numerical values. It will also be appreciated that where two or more values, or a range of values (e.g., less than, greater than, at least, and/or up to a certain value, and/or between two recited values) is disclosed or recited, any specific value or range of values falling within the disclosed values or range of values is likewise specifically disclosed and contemplated herein. Thus, disclosure of an illustrative measurement (e.g., length, width, thickness, etc.) that is less than or equal to about 10 units or between 0 and 10 units includes, illustratively, a specific disclosure of: (i) a measurement of 9 units, 5 units, 1 units, or any other value between 0 and 10 units, including 0 units and/or 10 units; and/or (ii) a measurement between 9 units and 1 units, between 8 units and 2 units, between 6 units and 4 units, and/or any other range of values between 0 and 10 units.

As used herein, "products" include compositions, formulations, mixtures, kits, systems, and so forth. Similarly, "methods" include processes, procedures, steps, and so forth.

As used herein, the term "about" or "approximately," with regard to a value, generally means or implies +/−10% of the stated value or amount represented thereby. Moreover, throughout the present disclosure, the term "about" is used in connection with a percent concentration or composition of a component or ingredient. In such instance, the term "about" or "approximately" and/or the term "+/−10%" implies and/or includes +/−10% of the stated numeric value, as opposed to +/−10 percentage points of the recited percent. By way of example, where 20% w/w of a component or ingredient reflects 20 g of the component or ingredient per 100 mL of total mixture, the term "about" and/or the term "+/−10%" implies and/or includes a recited range from 18 g to 22 g (i.e., from 18% w/w to 22% w/w), not a range of 10% w/w to 30% w/w. Alternatives for so-called "about" values and/or +/−10% include +/−1%, +/−2%, +/−3%, +/−4%, +/−5%, +/−6%, +/−7%, +/−8%, or +/−9% of the stated value, each of which is contemplated as a suitable alternative to or substitute for the term "about" or the use of +/−10% herein.

As used herein, the term "substantially" represents or implies an (or any) amount close to the stated amount (e.g., that still performs a desired function or achieves a (desired, intended, or expected) result). For example, the term "substantially" may refer to an amount that is within, or less than, 10%, 5%, 1%, 0.1%, 0.01%, or other percent of a stated amount. As used herein, the term "substantially devoid" means (1) an undetectable or unquantifiable amount, (2) less than or below an amount generally considered by those skilled in the art to reflect a detectable or quantifiable amount, and/or (3) less than or below an amount generally considered by those skilled in the art to be functional or able to achieve a (desired, intended, or expected) result (e.g., less than 10%, 5%, 1%, 0.1%, 0.01%, or other percent).

Percent concentrations or compositions, as presented herein, represent values measured as a w/w percent, w/v percent, or v/v percent.

As used herein, the term "soil" is used broadly to refer to any suitable plant growth medium, whether in field, greenhouse, laboratory, or other location.

As understood by those skilled in the art, a "hectare" (abbreviated "ha") is a metric system unit of area, primarily used in the measurement of land, and is equal to 100 acres (10,000 $m^2$) or 1 square hectometer ($hm^2$). An acre is about 0.405 hectare and one hectare contains about 2.47 acres.

Various aspects or embodiments of the present disclosure can be illustrated by describing components that are bound, coupled, attached, connected, and/or joined together. As used herein, the terms "bound," "coupled", "attached", "connected," and/or "joined" are used to indicate either a direct association between two components or, where appropriate, an indirect association with one another through intervening or intermediate components. In contrast, when a component is referred to as being "directly bound," "directly coupled", "directly attached", "directly connected," and/or "directly joined" to another component, no intervening elements are present or contemplated. Furthermore, binding, coupling, attaching, connecting, and/or joining can comprise mechanical, physical, and/or chemical association.

In addition, various aspects or embodiments of the present disclosure can be illustrated by describing components that are mixed together. As used herein, "mixed," "mixing," and similar terms indicate a physical combining or combination of two or more components. In some embodiments, the physical combining or combination results in a (chemical and/or physical) reaction. Such chemical reactions can be evidenced by a change in the chemical composition, pH, or other indicator relative to the components prior to being mixed (or as expected after being mixed absent the reaction). Thus, mixing and/or mixed components can include reacting and/or reacted components in certain embodiments. Accordingly, reference to mixing or mixed components includes a reference to reacting or reacted components.

The term "co-application" and similar terms refer to concurrent, sequential, and/or combined application of two or more components. For instance, two components can be co-applied by applying each component in a separate application concurrently, simultaneously, or sequentially (e.g., distinct applications separated by a period of time). The period of time can be very small (e.g., substantially, immediately following a first application) or longer (e.g., 1-60 seconds, 1-60 minutes, 1-24 hours, 1-7 days, 1-4 weeks, 1-12 months, and so forth, or any value or range of values therebetween). Concurrent or simultaneous applications can include overlapping application timeframes for the two or more components or application of a combination product comprising a mixture of the two or more components.

The term "comprising" is synonymous with "including," "having," "containing," or "characterized by." These terms are inclusive and open-ended and do not exclude additional, unrecited elements or method steps. The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole. The phrase "consisting essentially of" limits the scope of a claim to the specified materials or steps, plus those that do not materially affect the basic and novel characteristic(s) of the claimed subject matter. The terms "comprising", "consisting of", and "consisting essentially of" can be alternatively used. When one of these three terms is used, the presently disclosed and claimed subject matter can include the use of either of the other two terms.

The terms "plurality" and "at least two" are used interchangeably.

Specific language will be used herein to describe the illustrative embodiments. Nevertheless it will be understood that no limitation of the scope of the disclosure is thereby intended. Rather, it is to be understood that the language used to describe the exemplary embodiments is illustrative only and is not to be construed as limiting the scope of the disclosure (unless such language is expressly described herein as essential).

While the detailed description is separated into sections, the section headers and contents within each section are for organizational purposes only and are not intended to be self-contained descriptions and embodiments or to limit the scope of the description or the claims. Rather, the contents of each section within the detailed description are intended to be read and understood as a collective whole, where elements of one section may pertain to and/or inform other sections. Accordingly, embodiments specifically disclosed within one section may also relate to and/or serve as additional and/or alternative embodiments in another section having the same and/or similar products, methods, and/or terminology.

The following documents are incorporated by reference in their entirety: U.S. Pat. No. 5,549,728, U.S. Patent Publication No. 2018/0235257, and PCT Publication No. WO 2018/223087. Various embodiments of the present disclosure may include features (e.g., products, compositions, ingredients, components, methods, steps, aspects, embodiments, implementation, or other subject matter) disclosed or described in one or more of the foregoing references. Illustratively, one or more features disclosed in the above references, and implemented as described therein, may be included or implemented in one or more embodiments of the present disclosure. The implementation of such feature(s) may be in accordance with the disclosure provided in the above references and/or as provide in the present disclosure.

We previously described a urea-based plant fertilizer composition that comprised urea granules coated with a urease-inhibitive microbial fermentation lysate (see U.S. Pat. No. 5,549,728). This composition delayed the release (or loss) of nitrogen (from urea) into the soil (relative to the urea granules alone) when applied to the soil by slowing the rate of conversion of urea to ammonia (or available nitrogen).

Embodiments of the present disclosure include compositions and methods for increasing the amount of soluble phosphorus in soil, and more particularly to compositions and methods for solubilizing or increasing the level of soluble phosphorus and/or bioavailability of phosphorus in soil. Some embodiments include a microbial fermentation product, preferably comprising a microbial fermentation lysate, or a composition or product comprising the same, that is effective for solubilizing phosphorus in soil. The phosphorus may be a basal or existing amount or level of phosphorus in the soil. Some of the basal or existing amount or level of phosphorus in the soil may be biologically unavailable for plant consumption, uptake, and/or utilization. For example, some of the basal or existing amount or level of phosphorus in the soil may be bound to one or more soil components in a manner that renders the soil-disposed phosphorus bio-unavailable. Alternatively, or in addition, the phosphorus may be applied-phosphorus (e.g., phosphorus (or a source of phosphorus) applied to the soil), such as from a fertilizer or (plant) fertilizer component that includes or contains phosphorus (or a source of phosphorus). Such applied-phosphorus may become bio-unavailable, as described above, or may be at risk of becoming bio-unavailable, as described above. One or more embodiments of the present disclosure can be effective to (i) re-solubilize bio-unavailable phosphorus in the soil, (ii) reduce the bio-unavailability and/or insolubility of phosphorus in the soil, and/or (iii) prevent or attenuate bio-unavailability and/or insolubility (or reduce the risk of bio-unavailability and/or insolubility) of phosphorus in the soil.

Some embodiments can include a soil treatment product or a plant treatment product (e.g. compositions, systems, kits, etc.) or a method (e.g. processes, steps, etc.) for making and using the same. In some embodiments, the product can be applied to soil prior to, during, or following planting or growth. In some embodiments, the product can be applied to plants and/or soil in which plants are grown (e.g., planted, growing, to be planted, etc.). The product can be in the form of a liquid, solid, semi-solid, or combination thereof. The application can be by spraying, spreading, dripping, or any other suitable application method known in the art.

In some embodiments, the product can be co-applied with phosphorus or a source of phosphorus, such as a fertilizer (or plant fertilizer component), a mineral source of phosphorus (e.g., rock dust or colloidal phosphate, also called "soft phosphate"), a salt form of phosphorus (e.g., ammonium phosphate, potassium phosphate, etc.) or an organic source of phosphate (e.g., animal product, animal byproduct, animal waste product, etc.). Co-application can be simultaneous, consecutive or sequential (with either component being applied first), etc. Some embodiments of the present disclosure relate to a soil treatment product (or kit) or to a plant treatment product (or kit) that includes a plant fertilizer component and a microbial fermentation product. The plant fertilizer component and a microbial fermentation product can be mixed, as in a combinatorial composition, or separate, as in a kit. Some embodiments relate to methods of manufacturing and/or using such a product or kit (e.g., to (i) re-solubilize bio-unavailable phosphorus in the soil, (ii) reduce the bio-unavailability and/or insolubility of phosphorus in the soil, (iii) prevent or attenuate bio-unavailability and/or insolubility (or reduce the risk of bio-unavailability and/or insolubility) of phosphorus in the soil, and/or enhance the health of crops).

In some embodiments, the microbial fermentation product can be in liquid (e.g., suspension) or in substantially dry (e.g., bound to a carrier) form. In some embodiments, a (liquid) plant fertilizer product or component can be mixed (miscibly or immiscibly) with a (liquid) microbial fermentation product or component. In some embodiments, the (liquid) microbial fermentation product or component can coat or be bound to a (solid) plant fertilizer product or component. In some embodiments, the microbial fermentation product or component can be adsorbed to a surface of the (solid) plant fertilizer product or component and/or absorbed below the surface of the (solid) plant fertilizer product or component. In some embodiments, the (solid) plant fertilizer product or component can mixed with the (solid) microbial fermentation product (e.g., the microbial fermentation product bound to a carrier, adsorbed to a surface of the carrier and/or absorbed below the surface of the carrier).

Some embodiments include a method of manufacturing a soil treatment product or plant treatment product. The method can include mixing a plant fertilizer product or component with a microbial fermentation product or component. Additional embodiments include a method of enhancing the health of a plant. The method can include administering or applying an effective amount of soil treatment product or plant treatment product to the plant so as to improve one or more health indicators of the plant or plant population (e.g., as compared to a control). Each of the foregoing and other embodiments, including specific components, characteristics, and/or features thereof, will now be discussed in further detail.

Illustrative Fermentation Products

As used herein, a (microbial, bacterial, yeast, fungal, etc.) "fermentation product" or similar term refers to a resultant of at least a period of anaerobic metabolism or cellular respiration (e.g., by one or more microorganisms), as understood by those skilled in the art, and not merely bulk or other growth (e.g., of such microorganism(s) on or in a growth medium). In some embodiment, the fermentation product can also result from (one or more periods of) aerobic metabolism. The fermentation product can comprise a condensed and/or extracted fermentation product, a presscake, fermentation solubles, a fermentation extract, dried fermentation solubles, liquid fermentation product, dried fermentation biomass, or a combination thereof. As used herein, a "liquid fermentation product" or similar term refers to a fermentation product in liquid form. For instance, the liquid fermentation product can be or comprise components of a liquid fermentation culture (e.g., a whole or complete microbial fermentation suspension culture), including a (at least partially spent or post-fermentation) liquid culture medium or component(s) thereof, one or more microorganisms and/or cellular material (e.g., structural components) thereof, one or more (fermentation, anaerobic, aerobic, and/or other) metabolites (produced by the microorganisms, and other components as known in the art.

The microbial fermentation product can be processed (e.g., purified, filtered, isolated, separated, etc.) or crude (e.g., unprocessed). In some embodiments, the fermentation product can comprise the substantially unpurified resultant of microbial anaerobic (and optionally aerobic) metabolism, including one or more (fermentation) metabolites, a (liquid) fermentation medium (e.g., remaining after a fermentation process), and/or microbial cellular and/or structural components (e.g., whole cell lysate).

In at least one embodiment, the fermentation product includes one or more microorganisms and/or cellular material, such as cellular structural components, organelles, genetic material, macromolecules, or other component thereof. As used herein, the terms "microorganism," "microbial organism," "microbe," and the like refer to a species or strain of bacteria, archaea, certain protozoa, fungi, such as yeast, mold, etc., and algae, whether single-celled or multi-cellular organism, whether prokaryotic or eukaryotic, as understood by those skilled in the art. In some embodiments, the fermentation product includes (whole-cell) lysed microorganisms. The one or more microorganisms may include any number of microorganism species or strains, including, without limitation, one, two, three, four, five, six, seven, eight, nine, ten, or any other number of discrete (e.g., separately identifiable) microorganism strains or species.

Illustrative bacteria can include, without limitation: a species or strain of *Acetobacter*, including species *aceti, xylinum, suboxydans*, and so forth; a species or strain of *Bacillus*, including species apiaries, *azotofixans, brevis, cereus, circulars, coagulans, laterosporus, lentus, licheniformis, macerans, marinus, megaterium, pasteurii, polymyxa, pulvifaciens, pumilus, schlegelii, sphaericus, stearothermophilus, subtilis, thiaminolyticus, thuringiensis, tusciae*, and so forth; a species or strain of *Bacteroides*, including species *amylophilus, copillosus, ruminocola, suis*, and so forth; a species or strain of *Bifidobacterium*, including species *adolescentis, animalis, bifidum, infantis, longum, thermophilum*, and so forth; a species or strain of *Enterococcus*, including species *cremoris, diacetylactis, faecium, intermedius, lactis, thermophilus*, and so forth; a species or strain of *Lactobacillus*, including species *acidophilus, brevis, buchneri, bulgaricus, casei, cellobiosus, curvatus, delbruekii, farciminis, fermentum, helveticus, lactis, plantarum, reuteri*, and so forth; a species or strain of *Leuconostoc*, including species *citovorum, dextranicum, mesenteroides*, and so forth; a species or strain of *Megasphaera*, including species *elsdenii*, and so forth; a species or strain of *Pediococcus*, including species *acidilactici, cerevisiae (damnosus), pentosaceus*, and so forth; a species or strain of *Propionibacterium*, including species *freudenreichii, shermanii*, and so forth; a species or strain of *Rhodopseudomonas*, including species *palustris*, and so forth; and/or a species or strain of *Streptococcus*, including species *cremoirs, diacetylactis, faecium, intermedius, lactis, salivarius, thermophilus*, and so forth. Other embodiments include, for example, a species or strain of *Streptomyces*, including species *natalensis, chattanoogensis, griseus*, and so forth; a species or strain of *Xanthomonas*, including species *campestris*, and so forth; a species or strain of *Rhizopus*, including species *niveus*, and so forth; a species or strain of *Micrococcus*, including species *lysodeikticus*, and so forth; a species or strain of *Bacillus*, including species *cereus*, and so forth; and/or a species or strain of *Leuconostoc*, including species *citovorum, dextranicum*, and so forth.

In at least one embodiment, the fermentation product can include a first species and/or strain of microorganism (e.g., bacteria) and/or cellular or structural components thereof. Preferably, the fermentation product can include a first species and/or strain of lysed bacteria. The (lysed) bacteria can be or comprise one or more species or strain of lactic acid bacteria. In some embodiments, the one or more species or strain of lactic acid bacteria can include *Lactobacillus* (e.g., *acidophilus*, etc.). In some embodiments, the fermentation product can include one or more additional microbial (e.g., bacterial, fungal, yeast, mold, algae) species or strains (such as one or more of those listed herein) and/or cellular or structural components thereof. For instance, the fermentation product can include one or more additional (lysed) bacterial species or strains, other than the (first) microbial species or strain. In some embodiments, the fermentation product can include one or more (additional) lactic acid bacteria species and/or strains (e.g., other than the (first) lactic acid bacteria species or strain). In some embodiments, the fermentation product can include one or more non-lactic acid bacteria species and/or strains (e.g., other than the lactic acid bacteria species or strain).

In one or more (alternative) embodiments, the one or more microorganisms or additional microorganisms do not include a bacteria or bacterial species or strain. For instance, in some embodiments, the soil treatment product or plant treatment product or microbial fermentation product thereof can be substantially devoid of bacteria and/or cellular or structural components thereof. For instance, in some embodiments, the fermentation product can be a fungal (e.g., yeast and/or mold) fermentation product that is substantially devoid of bacteria and/or cellular or structural components thereof. Illustrative fungi can include, without limitation, yeast of phyla Ascomycota, such as *Saccharomycotina* and/or *Taphrinomycotina* (e.g., *Schizosaccharomycetes*), and/or phyla Basidiomycota, such as *Agaricomycotina* (e.g., *Tremellomycetes*) and/or *Pucciniomycotina* (e.g., *Microbotryomycetes*). Illustrative yeast can include a species or strain of *Candida* (previously known as *Torulopsis*) including species *utilis, glabrata, guilliermondii, lipolytica, pseudotropicalis*, and so forth; a species or strain of *Kluyveromyces* including species *lactis*, and so forth; and/or a species or strain of *Saccharomyces*, including species *cerevisiae, boulardii, fragilis*, and so forth. Illustrative fungi can further include a species or strain of *Aspergillus*, including species *niger, orizae* (or *oryzae*), and so forth; a species or strain of *Penicillium* including species *roquefortii*, and so forth; a species or strain of *Mucor*, including species *miehei, pusillus*, and so forth; a species or strain of *Morteirella*, including species *vinaceae*, and so forth; a species or strain of *Endothia*, including species *parasitica*, and so forth; and/or a species or strain of *Rhizomucor*, including species *miehei*, and so forth.

In some embodiments, however, the soil treatment product or plant treatment product or microbial fermentation product thereof can be substantially devoid of fungi, yeast, mold, and/or cellular or structural components of any one or more of the foregoing. For instance, in some embodiments, the fermentation product can be a bacterial fermentation product that is substantially devoid of fungi, yeast, mold, and/or cellular or structural components of any one or more of the foregoing. Some embodiments can be substantially devoid of mold and/or cellular or structural components thereof. In some embodiments, the fermentation product can be a bacterial and/or yeast fermentation product that is substantially devoid of mold and/or cellular or structural components thereof. Some embodiments can be substantially devoid of algae and/or cellular or structural components thereof. Certain embodiments can include at least one bacterial species or strain, at least one fungal (or yeast, or mold) species or strain, and/or at least one algae species or strain.

In some embodiments, the one or more microorganisms (of the microbial fermentation product) can be non-living, non-viable, non-metabolic, and/or lysed. Accordingly, the fermentation product can comprise one or more non-living, non-viable, non-metabolic, and/or lysed microorganism, or cellular material (e.g., cell structural components) thereof. In addition, the fermentation product can be substantially devoid of one or more or any living (e.g., metabolic, dormant, sporulated, etc.) microorganisms. For instance, the fermentation product can comprise or be comprised of less than about 50%, less than about 40%, less than about 30%, less than about 25%, less than about 20%, less than about 15%, less than about 10%, less than about 5%, less than about 1%, less than about 0.5%, less than about 0.25%, less than about 0.1%, less than about 0.05%, less than about 0.01%, or less living or viable microorganisms. In some embodiments, less than about 50%, less than about 40%, less than about 30%, less than about 25%, less than about 20%, less than about 15%, less than about 10%, less than about 5%, less than about 1%, less than about 0.5%, less than about 0.25%, less than about 0.1%, less than about 0.05%, or less than about 0.01% of the microorganisms of the microbial fermentation product (or microbial biomass thereof) can be or comprise living or viable microorganisms. Accordingly, whereas probiotic products or direct-fed microorganism (DFM)-containing products may comprise live cultures, a source of live or viable, naturally occurring microorganisms, etc., some embodiments of the present disclosure can include a microbial fermentation product that is substantially or entirely devoid of live or viable microorganisms (of one or more varieties). In particular, the microorganisms can be intentionally killed and/or inactivated (e.g., by lysing, such as by sonication, vigorous mixing or blending, heat inactivation, pH inactivation, inducing autolysis, and so forth), as known in the art.

In at least one (alternative) embodiment, the one or more microorganisms of the fermentation product can be in a spore form, a vegetative form, a metabolic form, or a combination thereof.

As indicated above, the fermentation product can also include a liquid (fermentation) medium (e.g., remaining after a fermentation process). Accordingly, the fermentation product can comprise a resultant of microbial liquid suspension (fermentation) culture grown in anaerobic (and optionally aerobic) conditions. The medium can include a liquid base component, such as water or a nutrient broth or broth-like component (e.g., Lysogeny Broth (LB), M9, fluid thioglycollate medium (FTM), NZ, NZY, or NZYM broths, SOB, SuperBroth, 2×YT, MOPS, milk, SOC, TB, and so forth). In some embodiments, the medium (or broth or broth-like component thereof) can include one or more nutrient, growth, and/or other components, such as a carbon source (e.g., carbohydrate, such as glucose, sucrose, fructose, lactose, galactose, etc.), (inorganic) nitrogen source, protein or amino acid source (e.g., synthetic proteins or amino acids, natural, plant- and/or animal-derived proteins or amino acids, etc.), vitamin (e.g., thiamine, riboflavin, folic acid, pantothenic acid, niacin, Vitamin $B_{12}$, Vitamin E, pyridoxine, Vitamin D, Vitamin K, Vitamin A, choline, etc.), mineral, trace element (e.g. copper, iron, manganese, zinc, molybdenum, chromium, selenium, etc.), essential element (e.g., magnesium, nitrogen, phosphorus, sulfur), salt (e.g., potassium phosphate, sodium phosphate, sodium chloride, ammonium chloride, magnesium sulfate, calcium chloride, etc.), yeast extract, enzyme, and/or any other suitable (fermentation) culture component, as known to those skilled in the art. In some embodiments, the medium can include one or more sources of carbohydrate, protein, vitamins, and minerals. In addition, certain fermentation products can specifically exclude one or more of the foregoing or other known culture components (e.g., serum, growth factor, hormone, enzyme, antibiotic, beef extract, whole blood, heat-treated blood, etc.). In some embodiments, the medium can include one or more nutrient, growth, and/or other components remaining after the fermentation process.

The fermentation product can include one or more metabolites. In at least one embodiment, the one or more metabolites comprise fermentation or other metabolites produced by the microorganisms (e.g., during anaerobic and optionally aerobic metabolism). Microbial fermentation metabolites can include, without limitation, one or more organic acids (e.g., lactic acid, acetic acid, formic acid, and so forth) amino acids, carbohydrates, fats, fatty-acids, enzymes, vitamins, and/or any other microbial metabolite component, as known to those skilled in the art. The metabolite(s) can be nutritionally beneficial to one or more plants or crops, or microorganisms associated therewith. In some embodiments, the metabolite(s) can comprise one or more microorganism waste products. In at least one embodiment, the fermentation product can be substantially devoid of antimicrobials (e.g., bacteriocins, antibiotics, hydrogen peroxide, and so forth); certain enzymes (e.g., proteases, amylases, lipases, glycosidases, DNA and/or RNA polymerases), and so forth.

In some embodiments, the metabolites can be at least partially purified (e.g., away from undesirable matter, such as waste products, fermentation medium, microbial cellular and/or structural material, etc.). Alternatively, the metabolites can be substantially unpurified in one or more embodiments. The substantially unpurified metabolites can be disposed in the microbial organisms and/or the (liquid) fermentation medium (e.g., outside of the microbial organisms). In some embodiments, the microorganisms can be lysed (e.g., such that substantially all of the metabolites are free in solution (i.e., not contained within the microorganisms)). Accordingly, in some embodiments, the fermentation product can comprise a mixture (e.g., solution, colloid, suspension, colloidal suspension, emulsion, etc.) of post-fermentation liquid medium, one or more microbial fermentation metabolites (e.g., anaerobic and/or aerobic metabolic products), and microbial cellular and/or structural components (e.g., whole cell lysate). In at least one embodiment, the mixture can be crude, raw, and/or substantially unpurified.

Illustrative fermentation methods, parameters, etc. include those known to those skilled in the art. The fermentation product can be prepared by one or more fermentation processes, including growing of one or more microbial (e.g., bacterial) species or strains or cell lines on a solid growth medium, as known in the art. The microbial culture can be grown in natural and/or ambient conditions in some embodiments. In other embodiments, the culture can be grown in artificial and/or optimized conditions. The microbial cultures can be grown at a biologically-suitable temperature (e.g., between about 20-50 degrees Celsius (° C.) or between about 30-40° C.), acidity (pH) (e.g., about 3.0-8.0), etc. Moreover, the growth medium can include one or more of the above-described or other medium components, including, without limitation, a (substantially solid) base component (e.g., agar or other suitable base component), nutrient, and/or other components (e.g., carbon and/or (inorganic) nitrogen source, vitamin, mineral, trace element, essential element, amino acid, amino acid source, salt, yeast extract, and/or any other culture component, as known to those skilled in the art. In at least one embodiment, the microbial culture can be grown in aerobic and/or anaerobic conditions.

In some embodiments, the fermentation process can also include inoculating one or more (of the) viable microorganisms or microbial lines (or colonies thereof) into a liquid growth medium (e.g., to form a starter suspension culture), as known in the art. Liquid (suspension) cultures can also be grown in natural and/or ambient or artificial and/or optimized conditions, as described above. The liquid growth medium can include one or more of the above-described or other medium components.

In at least one embodiment, the viable starter culture (or a suitable portion thereof, including a whole fraction, extract, cell pellet, etc. thereof) can be transferred into liquid fermentation medium (e.g., to form a liquid fermentation culture). The liquid fermentation medium and/or culture can be disposed in a bioreactor, flask, or other suitable growth container. Moreover, the liquid fermentation medium and/or culture can include one or more of the above-described or other medium components. Similarly, the liquid fermentation culture can also be grown in natural and/or ambient or artificial and/or optimized conditions, as described above. In at least one alternative embodiment, the one or more viable microorganisms or microbial lines (or colonies thereof) can be inoculated directly into a liquid fermentation medium.

The fermentation culture can be grown under anaerobic and/or aerobic conditions for a first period of time and/or under first fermentation conditions, as known in the art and described herein. For instance, the fermentation culture can be grown for between about 0.5 days and about 5 days, at a temperature between about 10-50° C., and/or at a pH between about 2-10. After the first period of time, the fermentation culture can be grown under anaerobic and/or aerobic conditions for a second period of time and/or under second fermentation conditions, as known in the art and described herein. For instance, the second period of time can be between 0.5 days and about 5 days. The second fermentation conditions can include a temperature between about 10-50° C., a pH between about 2 and about 10, etc. In some embodiments, the second period of time and/or second fermentation conditions can be different than the first period of time and/or first fermentation conditions. For instance, the fermentation culture (or suitable portion thereof) can be transferred into the second fermentation conditions and/or a second fermentation medium. The second fermentation medium can be disposed in a bioreactor, flask, or other suitable growth container and/or can include one or more of the above-described or other medium components.

It will be appreciated that the fermentation process can also include additional period(s) of time, fermentation condition(s), fermentation media, etc., as known in the art and described herein. At the completion of the fermentation process, the fermentation culture can be or comprise a microbial fermentation product and/or can be optionally and/or additionally processed to form a microbial fermentation product. For instance, in certain embodiments, the (anaerobically and/or aerobically metabolic) microorganisms of the fermentation culture can be intentionally killed and/or inactivated (e.g., by lysing, such as by sonication, vigorous mixing, or blending, heat inactivation, pH inactivation or killing, inducing autolysis, and so forth), as known in the art. In at least some embodiments, fermentation metabolites disposed within the microbial cells or organisms of the fermentation culture can thereby be released into the medium (e.g., such that the metabolites are free in solution or other liquid medium type). The non-living, non-viable, non-metabolic, and/or lysed microorganism, or cellular material (cell structural components) thereof, can be retained in the liquid fermentation medium or at least partially (e.g., substantially and/or completely) removed therefrom (e.g., via (ultra) centrifugation, filtration, etc.). In certain embodiments, the fermentation product comprises a whole-cell and/or whole-culture lysate of the fermentation culture (e.g., without substantial removal, purification, isolation, etc. of one or more (e.g., any) component(s) of the fermentation culture). In alternative embodiments, however, one or more components of the fermentation culture can be at least partially and/or substantially removed, purified, isolated, etc.

Accordingly, the fermentation product can be in a substantially liquid (suspension, solution, colloid, gel, slurry, etc.) form and/or can include one or more components of a microbial fermentation culture (e.g., prepared as described herein and/or as known in the art). In at least one illustrative embodiment, the fermentation product can comprise a liquid suspension comprising the substantially unpurified resultant of microbial anaerobic and optionally aerobic metabolism, including (i) substantially all of the (fermentation) metabolites produced by the fermentation culture, (ii) the liquid fermentation medium in which the fermentation culture was grown (e.g., remaining after a fermentation process), and (iii) a whole-cell lysate the microorganisms or culture, including all of the microbial cellular and/or structural components of the microorganisms grown in the fermentation culture. Alternatively, the fermentation product can be in substantially solid form (e.g., dried, freeze-dried, vacuum-dried, heat-dried, dehydrated, extracted, etc.), comprising one or more of the foregoing components of the fermentation culture.

Illustrative Fertilizer Components

Illustrative fertilizer components include fertilizers comprising or containing phosphorus or a source of phosphorus. In some embodiments, the source of phosphorus can be or comprise one or more phosphorus-based (plant, seed, or soil) fertilizer component, or fertilizer component that includes phosphorus or a source of phosphorus. The one or more phosphorus-based plant fertilizer component, or fertilizer component that include phosphorus or a source of phosphorus, can be or comprise a phosphorus fertilizer (e.g., P), a bi-blend fertilizer comprising phosphorus and an additional fertilizer component, such as potassium or nitrogen (e.g., NP, PK), or a tri-blend fertilizer comprising phosphorus and two additional fertilizer components, such as potassium and nitrogen (e.g., NPK), a source of phosphorus (e.g., in the form of $P_2O_5$), a mineral source of phosphorus (e.g., rock dust or colloidal phosphate, also called "soft phosphate"), a salt form of phosphorus (e.g., ammonium phosphate, potassium phosphate, etc.) or an organic source of phosphate (e.g., animal product, animal byproduct, animal waste product, etc.). Illustratively, the plant fertilizer component can comprise $P_2O_5$ or another form or source of phosphorus.

In certain embodiments, the plant fertilizer product, or plant fertilizer component thereof, can be (substantially or entirely) devoid of urea and/or nitrogen-containing fertilizer components. In certain embodiments, the plant fertilizer product, or plant fertilizer component thereof, can be (substantially or entirely) devoid of nitrogen-containing fertilizer components.

The soil treatment product or plant treatment product and/or fertilizer component thereof can be in a (substantially) dry, solid or liquid state. In some embodiments, the fertilizer component and the microbial fermentation product can both be in a (substantially) dry and/or solid form. In some embodiments, the fertilizer component and the microbial fermentation product can both be in a liquid form. In some embodiments, the fertilizer component can be in (substantially) dry and/or solid form and the microbial fermentation product can be in a liquid form. In some embodiments, the fertilizer component can be in (substantially) dry and/or solid form and the microbial fermentation product can be in liquid form.

In some embodiments, the plant fertilizer component is in solid form—i.e., a solid, granular, or powdered fertilizer, as known in the art, sold commercially, etc. Illustratively, solid form a fertilizer component can comprise a liquid form fertilizer applied to, bound to, adsorbed to, or absorbed to a solid or dry carrier, as described herein. In some embodiments, the carrier can be or comprise an organic carrier (comprising one or more organic component or material) or an earthen carrier (comprising one or more earthen component or material). Earthen carriers, components, and/or materials can include, for example, phyllosilicate(s), such as a 1:1 or 2:1 clay mineral phyllosilicates, phyllosilicate(s) of potassium (K), sodium (Na), calcium (Ca), and/or aluminum (Al), etc. In some embodiments, the carrier can comprise, aliettite, attapulgite, beidellite, bentonite, biotite, calcium silicate, calcium stearate, chlorite (e.g., clinochlore, chamosite, nimite, pennantite, and/or zinc, lithium, and/or calcium species thereof), cookeite, diatomite and/or other diatomaceous earth products, dickite, glauconite, halloysite, hectorite, hydrophobic silica, illite, kaolin, kaolinite, montmorillonite, muscovite, nacrite, nontronite, palygorskite, phyllite, saponite, sauconite, sepiolite, sericite, serpentine, smectite, talc, tonstein, or vermiculite.

In some embodiments, the carrier can be or comprise a coal derivative, hummates, humic acids, fulvic acids, leonardide, or lignosulphonates. In some embodiments, the carrier can be or comprise (dried) plant material (e.g., dried seaweed, dried soy, etc.), plant extract (seaweed extract, soy extract, etc.), meal, flour, protein powders, and so forth. Certain carriers can be or comprise a naturally-occurring material or component. Other carriers can be or comprise an artificial and/or synthesized material or component.

In at least one embodiment, the carrier can be or comprise a microbial fermentation product in solid form or microbial fermentation product-bound carrier, as described herein. Illustratively, a liquid fertilizer component can be applied to, bound to, adsorbed to, or absorbed to the microbial fermentation product in solid form. In some embodiment, the plant fertilizer component in solid form can be mixed or admixed with, or co-applied with, a microbial fermentation product in solid form.

In at least one embodiment, the plant fertilizer component is in liquid form—i.e., a liquid fertilizer. In some embodiment, the liquid plant fertilizer component or plant fertilizer in liquid form can be mixed or admixed with, or co-applied with, a microbial fermentation product in liquid form. In some embodiments, the liquid fertilizer component can be applied to, bound to, adsorbed to, or absorbed to a solid component or carrier, as described herein. Illustratively, a liquid microbial fermentation product can be applied to, bound to, adsorbed to, or absorbed to the microbial fermentation product in solid form.

Miscellaneous Illustrative Components

Some embodiments of the present disclosure can include one or more additional components and/or ingredients. For instance, embodiments also include one or more of the following: (1) amino acids, (2) peptides, (3) hydrolyzed proteins, (4) organic and/or carboxylic acids, (5) carbohydrates, (6) plant extracts, (7) lignosulfonates, (8) humic and/or fulvic acids, (9) macro-, secondary-, and/or micronutrients, (10) chelated and/or complex minerals, (11) vitamins, (12) wetting agents, (13) dispersants, and (14) surfactants. Some embodiments can also include one or more diluting agents or diluents. The one or more diluting agents or diluents can dilute one or more of the product components. The one or more diluting agents or diluents can also or alternatively enhance uniform distribution of the plant fertilizer.

Some embodiments of the present disclosure can include one or more additional (supplementing) components and/or ingredients. For instance, embodiments can include one or more vitamins (e.g., Vitamin A, Vitamin B complex (e.g., Vitamin $B_1$, Vitamin $B_2$, Vitamin $B_3$, Vitamin $B_4$, Vitamin $B_5$, Vitamin $B_6$, Vitamin $B_7$, Vitamin $B_8$, Vitamin $B_9$, Vitamin $B_{12}$, Choline), Vitamin C, Vitamin D, Vitamin E, Vitamin K, etc.), minerals or trace minerals (or elements) (e.g., magnesium, calcium, phosphorus, potassium, sodium, boron, cobalt, chloride, chromium, copper, fluoride, iodine, iron, manganese, molybdenum, selenium, zinc, nickel, vanadium, silicon, tin, etc.), amino acids (e.g., essential and/or non-essential), health supplements (e.g., glucosamine, chondroitin, etc.), pharmaceuticals (e.g., chemical additive, etc.), nutraceuticals, plants or plant parts (e.g., berries, leaves, stems, roots, shoots, seedling, cotyledon, etc.), plant products or extracts (kelp, algae, or other extract), herbs, phytonutrients, carotenoids, enzymes (e.g., amylase, xylanase, proteases, phytase, glucanase), probiotics, organic acids, etc. Certain embodiments can be substantially and/or entirely devoid of probiotic and/or living microorganism of one or more variety.

Certain embodiments can include one or more surfactants, such as a binding and/or emulsifying agent (e.g., diacetyl tartaric acid esters of mono and diglucerides, edible fats and oils, edible fat-forming fatty acids, ethoxylated mono and diglycerides, methyl glucoside coconut oil ester, mineral oil, mono and diglycerides of edible fats or oils or edible fat-forming acids, monosodium phosphate derivatives of mono and diglycerides of edible fats or oils or edible fat-forming fatty acids, polyoxyethylene glycol 400 (mono and dioleates), polysiloxane, polysorbate 80, polysorbate 60 (polyoxy ethylene (20) sorbitan monostearate, propylene glycol, sodium stearoyl lactylate, sorbitan mono-stearate with or without polysorbate 60, etc., or combination thereof.

Some embodiments can include one or more stabilizing, anti-caking, and/or processing agents (e.g., carrageenan, gelatin gum, guar gum, lecithin, locust bean gum, stearic acid, sodiumcarboxy-methyl-cellulose, sodium silico-aluminate, tara gum, xanthan gum, etc.), dust control agents (e.g., mineral oil, paraffin, etc., or a combination of two or more of the foregoing), preservatives, and/or other beneficial ingredients, or combination thereof.

Some embodiments can also include one or more diluting agents or diluents. The one or more diluting agents or diluents can dilute one or more of the products into the mixture. The one or more diluting agents or diluents can also or alternatively enhance uniform distribution of the product or supplement component(s) into the mixture. Illustrative diluting agents or diluents can include, without limitation, water or other aqueous solution, a vitamin and/or mineral mix, an initial portion of the plant fertilizer component, an earthen carrier, or any other suitable product or supplement component-diluting or distributing element.

In some embodiments, the diluent can enhance spreadability of the dry product. The diluent can comprise one or more phyllosilicates. The diluent can also be referred to as a carrier herein. The carrier component can comprise a solid, dry, and/or substantially dry carrier. In at least one embodiment, the carrier can comprise an organic and/or earthen carrier, comprising one or more organic and/or earth components or materials. Earthen carriers, components, and/or materials can include, for example, phyllosilicate(s) (e.g., of potassium (K), sodium (Na), calcium (Ca), and/or aluminum (Al)). The phyllosilicate can be of the chlorite, clay, mica, or serpentine variety. In at least one embodiment, the carrier can comprise one or more 1:1 or 2:1 clay mineral phyllosilicates. In at least one embodiment, the carrier can comprise a plant fertilizer component, as disclosed and/or described herein.

Illustrative carriers can comprise, without limitation, aliettite, attapulgite, beidellite, bentonite, biotite, calcium silicate, calcium stearate, chlorite (e.g., clinochlore, chamosite, nimite, pennantite, and/or zinc, lithium, and/or calcium species thereof), cookeite, diatomite and/or other diatomaceous earth products, dickite, glauconite, halloysite, hectorite, hydrophobic silica, illite, kaolin, kaolinite, montmorillonite, muscovite, nacrite, nontronite, palygorskite, phyllite, saponite, sauconite, sepiolite, sericite, serpentine, smectite, talc, tonstein, vermiculite, hummates, humic acids, fulvic acids, lignosulphonates, and so forth. Certain carriers can be or comprise a naturally-occurring material or component. Other carriers can be or comprise an artificial and/or synthesized material or component. Carriers can also include (dried) plant materials and/or extracts, meal, flour, protein powders, soy, seaweed, and so forth.

In some embodiments, the plant fertilizer component can be, comprise, function as, or serve as a carrier. Accordingly, in some embodiments, the (liquid) microbial fermentation product can be applied to, bound to, adsorbed to, or absorbed to the plant fertilizer component in solid form.

In some embodiments, the carrier can have a moisture content of less than about 20% by weight, less than about 15% by weight, less than about 10% by weight, less than about 5% by weight, less than about 3% by weight, less than about 2% by weight, or less than about 1% by weight. In at least one embodiment, the carrier can have a moisture content between about 0.25% and about 1%, 2%, 3%, 4%, 5%, 10%, 15%, or 20% by weight, between about 0.5% and about 1%, 2%, 3%, 4%, 5%, 10%, 15%, or 20% by weight, between about 1% and about 2%, 3%, 4%, 5%, 10%, 15%, or 20% by weight, or between about 2% and about 3%, 4%, 5%, 10%, 15%, or 20% by weight. As used herein, the term "substantially dry carrier" refers to a carrier having one or more of the foregoing moisture contents. Such substantially dry carriers can be understood generally to be solid, dry substances, while still having at least some moisture associated therewith.

In some embodiments, the carrier can be in powdered, granular, and/or particulate form or have an average particle size between about 20-297 microns (e.g., corresponding to approximately 625-50 mesh). In at least one preferred embodiment, the carrier can have an average particle size of about 74 microns (or about 200 mesh)+/−20%, 15%, 10%, 8%, or 5%. In certain embodiments, the solid carrier can be sized (e.g., by milling, crushing, grinding, etc.) to a suitable average particle size. Accordingly, in some embodiments, the solid carrier can be a mined and milled earth component having a suitable average particle size.

In at least one embodiment, the fermentation product can be bound to the carrier to form a fermentation product-bound carrier. For instance, the fermentation product can be physically and/or chemically bound to the carrier (e.g., by chemical reaction or means). In some embodiments, the fermentation product can be bound to the carrier by static electricity or by a force other than (general or macro) static electricity. In certain embodiments, binding of the fermentation to the carrier can increase bioavailability of at least one of the metabolites (e.g., relative to being free in solution or extracted, purified, and/or isolated from solution or cell). Accordingly, the fermentation product can be applied to the carrier, bound to the outer surface of the carrier, and/or bound to a portion of the carrier adjacent to or below the surface. For instance, in some embodiments, at least a portion of the liquid fermentation product can be (i) adsorbed to the surface of the carrier and/or (ii) absorbed below the surface of the carrier. The liquid fermentation product can also be bound to the carrier by drying thereon and/or therein after being applied thereto. Thus, in certain embodiments, the liquid fermentation product can be at least partially dry-bound to the carrier. As used herein, "dry-bound," and similar terms refers to the persistent and/or sustained physical association of two or more substances by physical and/or chemical forces established during a drying process.

In at least one embodiment, the fermentation product can substantially or at least partially coat the carrier. For instance, the fermentation product can be applied to the carrier (e.g., such that the liquid portion of the fermentation product does not dissolve the carrier and/or such that the applied portion of the fermentation product substantially or at least partially coat surrounds the carrier). In some embodiments, at least a portion of the fermentation product can be chemically bound to the carrier. For instance, the fermentation product can be reacted with the carrier (e.g., such that a physical and/or chemical binding reaction occurs). The reaction can be endothermic or exothermic. In addition, the reaction can be facilitated and/or accelerated by one or more enzymes or other reaction components or parameters (e.g., heat, air (flow), mixing, etc.). The enzyme or other component can be a metabolic reaction product, a fermentation culture component, and/or a separate component added prior to or during application of the fermentation product to the carrier.

In some embodiments, the fermentation product-bound carrier can be in a solid form. For instance, the fermentation product-bound carrier can have a moisture content of less than about 20% by weight, less than about 15% by weight, less than about 10% by weight, less than about 5% by weight, less than about 3% by weight, less than about 2% by weight, or less than about 1% by weight. In at least one embodiment, the fermentation product-bound carrier can have a moisture content between about 0.25% and about 1%, 2%, 3%, 4%, 5%, 10%, 15%, or 20% by weight, between about 0.5% and about 1%, 2%, 3%, 4%, 5%, 10%, 15%, or 20% by weight, between about 1% and about 2%, 3%, 4%, 5%, 10%, 15%, or 20% by weight, or between about 2% and about 3%, 4%, 5%, 10%, 15%, or 20% by weight. Accordingly, the fermentation product-bound carrier can be substantially dry. In other embodiments, the fermentation product-bound carrier can be in a substantially liquid (suspension, solution, colloid, gel, slurry, etc.) form.

In one or more embodiments, the fermentation product can be bound to the carrier such that the fermentation product and/or one or more components thereof is maintained at a suitable pH or pH range, or in an environment having a suitable pH or pH range. For instance, in some embodiments, the carrier and/or the fermentation product-bound carrier can provide and/or have a pH between about 2-10, preferably between about 2-8, more preferably between about 2-6, still more preferably between about 2-5, still more preferably between about 2-4, still more preferably between about 2-3, still more preferably between about 3-10, still more preferably between about 3-8, still more preferably between about 3-6, still more preferably between about 3-5, still more preferably between about 3-4, still more preferably between about 4-10, still more preferably between about 4-8, still more preferably between about 4-6, still more preferably between about 4-5.

The carrier component can also or alternatively comprise a liquid or liquid composition (e.g., solution, suspension, colloid, mixture, etc.). Illustrative liquid carriers include, without limitation, water or other aqueous liquid, an oil, and organic liquid, or any suitable liquid composition or carrier, such as a solvent (of a solution), a continuous phase (of a colloid), an external phase (of a suspension), etc. In some embodiments, the (liquid) carrier can be or comprise a medium, such as a suspension culture medium, water, a mixture (e.g., solution, suspension, colloid, etc.), humic and/or fulvic acid(s), lignosulphonate(s), and so forth or other component disclosed or described herein, a (liquid) plant fertilizer component, or other fluid or liquid. In at least one embodiment, the fermentation product can be mixed with the carrier to form a diluted or mixable fermentation product.

Illustrative Combination Products

As used herein, "combination product" and similar terms refer to a composition, mixture, or other combination (e.g., reaction product) that includes at least a plant fertilizer component and a microbial fermentation product. For instance, the combination product can be, comprise, or include a plant fertilizer component, a microbial fermentation product, an optional carrier (e.g., to which the microbial fermentation product is applied), and one or more optional additional ingredients (e.g., vitamin(s), mineral(s) or trace mineral(s), amino acid(s), health supplement(s), pharmaceutical(s), nutraceutical(s), plant(s) or plant part(s), plant product(s) or extract(s), herb(s), phytonutrient(s), carotenoid(s), enzyme(s), probiotic(s), organic acids, and/or any other suitable additive or other component, as described above. Certain embodiments can be substantially and/or entirely devoid of probiotic and/or living microorganism of one or more variety.

In at least one embodiment, a combination soil treatment product or plant treatment product comprises a microbial fermentation product (or lysate) and, preferably mixed or combined with, a (substantially liquid) plant fertilizer component, preferably at a ratio between about 1:500 and about 1:1000, fermentation product to plant fertilizer component, or vice versa. In some embodiments, the ratio of fermentation product to plant fertilizer component, or vice versa can be up to, between, and/or about 1:1, 1:2, 1:2.5, 1:3, 1:4, 1:5, 1:6, 1:7, 1:8, 1:9, 1:10, 1:50, 1:100, 1:200, 1:300, 1:400, 1:500, 1:600, 1:700, 1:800, 1:900, 1:1000, or more.

In some embodiments, the soil treatment product or plant treatment product can be pre-mixed as a combination product. The combination product can comprise a concentrate, in some embodiments. In at least one embodiment, the combination product can be diluted (e.g., with water) to form an application-ready product. In certain embodiments, the product can be mixed or pre-mixed (e.g., tank mixed) at or around the time of application (e.g., in the field). In some embodiments, the mixture can be or comprise a suspension, emulsion, solution, etc.

In one or more embodiments, the mixture or combination product can be stabilized, preferably by (1) adjusting the pH of the mixture to about pH 5-7, (2) adding one or more (chemical, synthetic, natural, organic, etc.) stabilizers, (3) adding or co-formulating with water and/or organic mineral oil base, (4) encapsulating the mixture, etc. In some embodiments, the pH of the mixture can be adjusted, if necessary, to about pH 5, 5.5, 6, 6.5, or 7.

One or more alternative or additional embodiments of a combination product comprises a substantially dry fermentation product (e.g., bound to a (solid or dry) carrier) and a substantially dry plant fertilizer component, preferably at a ratio between about 1:1 and about 1:100, fermentation product-bound carrier to plant fertilizer component, or vice versa. In some embodiments, the ratio of fermentation product to plant fertilizer component, or vice versa can be up to, between, and/or about 1:1, 1:2, 1:2.5, 1:3, 1:4, 1:5, 1:6, 1:7, 1:8, 1:9, 1:10, or more.

Some embodiments can include mixing dry (powder) forms of the fermentation product (e.g., bound to a (solid or dry) carrier) and plant fertilizer component. Certain embodiments can include milling the fermentation product-bound carrier and the plant fertilizer component to the same or similar particle size. In some embodiments, the (dry form) combination product can be water soluble, water miscible, and/or (chemically and/or structurally) configured for producing a stable suspension (e.g., when mixed with an aqueous fluid, such as water).

One or more alternative or additional embodiments of a combination product comprises a liquid fermentation product bound to (e.g., adsorbed to a surface of and/or absorbed below the surface of) a substantially dry plant fertilizer component, preferably at a ratio between about 1:1 and about 1:100, fermentation product to plant fertilizer component, or vice versa. In some embodiments, the ratio of fermentation product to plant fertilizer component, or vice versa can be up to, between, and/or about 1:1, 1:2, 1:2.5, 1:3, 1:4, 1:5, 1:6, 1:7, 1:8, 1:9, 1:10, or more.

Thus, each of the microbial fermentation product and the plant fertilizer component can be (or be provided) in liquid or solid (or substantially dry) form. The combination product, then, can comprise a liquid (e.g., formed by combining the liquid microbial fermentation product with the liquid plant fertilizer component) or a solid (e.g., formed by combining the liquid microbial fermentation product with the solid plant fertilizer component or by combining the solid microbial fermentation product with the solid plant fertilizer).

One or more alternative or additional embodiments can comprise a kit or system. The kit or system can comprise (i) the (liquid or solid) microbial fermentation product and (ii) the (liquid or solid) plant fertilizer component, each as disclosed and/or described herein. The kit or system can also include instructions for (i) combining and/or (ii) administering (e.g., co-administering) the (liquid or solid) microbial fermentation product and (ii) the (liquid or solid) plant fertilizer component, each as disclosed and/or described herein. The instructions can be in written or electronic (computer readable media) form. The instructions can include one or more method steps, as describe ad/or disclosed in further detail herein (e.g., below).

Methods

At least one embodiment includes a method of producing a soil treatment product or plant treatment product. An illustrative method can comprise providing a plant fertilizer component together with the microbial fermentation product and/or mixing the plant fertilizer component with the microbial fermentation product. An illustrative method of producing a soil treatment product or plant treatment product comprises combining a microbial fermentation product (in lysate or substantially liquid form) with a plant fertilizer component (in substantially liquid form), preferably at a ratio between about 1:500 and about 1:1000, fermentation product to plant fertilizer component, or vice versa, to form a soil treatment product or plant treatment product. One or more alternative or additional embodiments of producing a soil treatment product or plant treatment product comprises combining a substantially dry fermentation product (bound or not bound to a carrier) with a plant fertilizer component (in (substantially) solid, liquid, or semi-solid form), preferably at a ratio between about 1:500 and about 1:1000, fermentation product to plant fertilizer component, or vice versa, to form a soil treatment product or plant treatment product.

The method of producing a microbial fermentation product can include culturing one or more live and/or viable microorganisms (or microbial species or strains or lines thereof) under anaerobic (and optionally aerobic) conditions (e.g., in a fermentation medium, etc., as known in the art and/or described herein) and/or such that the microorganisms produce at least one fermentation metabolite. Some embodiments can also include (intentionally) killing and/or inactivated (e.g., by lysing, such as by sonication, vigorous mixing, or blending, heat inactivation, pH inactivation or killing, inducing autolysis, and so forth) such that the fermentation product is substantially devoid of the live and/or viable microorganisms (e.g., substantially devoid of one or more or any living microorganisms). The fermentation product can, however, include one or more (e.g., substantially all) cellular and/or structural components of the microorganisms. The fermentation product can also include at least one fermentation metabolite and/or the fermentation culture medium (or component(s) thereof).

Some embodiments include mixing (or reacting) one or more vitamins and/or minerals with the fermentation product. In particular, one or more of the vitamins and/or minerals can be bound or chelated to at least one of the metabolites of the fermentation product (e.g., such that the bioavailability of the at least one of the metabolites is increased thereby).

At least one embodiment also includes a method of producing a fermentation product-bound carrier. In some embodiments, the fertilizer product (e.g., solid, granular, or powdered NPK or other phosphorus-containing fertilizer) can be, comprise, or serve as the carrier. The fermentation product (in substantially liquid form) can be fluidly applied to the carrier, such as by spraying, pouring, dripping, etc. and/or such that the fermentation product binds to the carrier. The carrier can be or comprise a solid and/or substantial dry carrier, such as an earthen carrier, as described herein, optionally comprising one or more phyllosilicates. The carrier can also or alternatively be or comprise a liquid carrier, such as water or a water source or supply, as described herein. The fermentation product can be applied to or combined or mixed with the carrier, such that fermentation product becomes dispersed within or throughout the carrier.

The fermentation product can be applied to the carrier at a ratio of up to, at least, and/or between approximately 1:1 by weight, approximately 1:1.5 by weight, approximately 1:2 by weight, approximately 1:2.5 by weight, approximately 1:3 by weight, approximately 1:3.5 by weight, approximately 1:4 by weight, approximately 1:5 by weight, approximately 1:6 by weight, approximately 1:7 by weight, approximately 1:8 by weight, approximately 1:9 by weight, or approximately 1:10 by weight, fermentation product to carrier, or vice versa. At least a portion of the fermentation product can physically and/or chemically react or mix with and/or bind to the carrier. For instance, at least a portion of the fermentation product can be adsorbed to a surface of the carrier and/or absorbed below the surface of the carrier.

At least one embodiment can include mixing the carrier and/or fermentation product-bound carrier (e.g., before, after, and/or while applying the fermentation product to the carrier). The carrier and/or fermentation product-bound carrier can be mixed in any suitable container or on any suitable surface. For instance, the carrier can be mixed by rotation (e.g., in a drum or barrel), by shaking (e.g., on or in a tray or receptacle), by stirring (e.g., on or in a tray or receptacle), and so forth. In addition, the carrier can be mixed at any suitable speed. Regardless of the specific type of mixing, container, surface, etc., mixing can be measured in terms of revolutions, rotations, and/or reciprocations per minute (rpm). For instance, the carrier can be mixed at a speed of between about 1-500 rpm, between about 5-300 rpm, between about 10-200 rpm, between about 15-100 rpm, between about 20-60 rpm, between about 30-50 rpm, or any range therebetween. In some embodiments, suitable mixing speed can ensure that the carrier, fermentation product-bound carrier, and/or other combination product is appropriately and/or optimally processed. For instance, a mixing speed above a certain threshold can reduce the size and/or uniformity of product particles below an appropriate and/or optimal level. Similarly, a mixing speed below a certain threshold can inhibit sufficient or successful application or coating of the fermentation product around or about the carrier and/or can lead to clumping of the product, causing the size and/or uniformity of product particles to be inappropriate and/or suboptimal. Regardless, the effects of improper mixing can include reduced stability and/or activity of the product.

Certain embodiments can include applying air or a flow of air. The air or flow of air can be applied (i) while mixing the carrier and/or fermentation product-bound carrier (e.g., before, after, and/or while applying the fermentation product to the carrier), (ii) over a specific, predetermined, or defined period of time (e.g., between about 6-120 hours, between about 12-96 hours, between about 12-120 hours, between about 48-60 hours, etc.) and/or (iii) until the fermentation product-bound carrier achieves a suitable moisture content, as described herein. Moreover, the air flow can be applied at a rate of greater than or equal to about 25 $m^3$/minute, up to about 200 $m^3$/minute, between about 25 $m^3$/minute and about 200 $m^3$/minute, between about 40 $m^3$/minute and about 150 $m^3$/minute, between about 50 $m^3$/minute and about 100 $m^3$/minute, or between about 60 $m^3$/minute and about 75 $m^3$/minute, in certain embodiments. Preferably, the air or air flow can be applied at a rate of about 68 $m^3$/minute. In some embodiments, suitable temperature can ensure that the mixture dries to a suitable moisture content in a suitable amount of time, thereby reducing, inhibiting, and/or substantially preventing and/or avoiding product caking or clumping, microbial contamination and/or growth, etc.

In at least one embodiment, the method includes maintaining the carrier, mixed fermentation product and carrier, and/or fermentation product-bound carrier at a suitable reaction temperature (e.g., below about 60° C., below about 58° C., below about 56° C., below about 55° C., below about 52° C., below about 50° C., below about 48° C., below about 45° C., below about 42° C., below about 40° C., below about 39° C., below about 38° C., below about 37° C., below about 35° C., below about 32° C., below about 30° C., below about 25° C., below about 20° C., etc. and/or above about 5° C., above about 10° C., above about 15° C., or above about 20° C.) during the reaction and/or binding process. In some embodiments, suitable reaction temperature can ensure that the reaction occurs at an optimal speed/rate, the reaction product is dried (at a suitable rate) to a suitable moisture content, etc. In addition, the method can include maintaining the reaction product and/or fermentation product-bound carrier at a suitable maintenance and/or storage temperature (e.g., below about 42° C., below about 40° C., below about 39° C., below about 38° C., below about 37° C., below about 35° C., below about 32° C., below about 30° C., below about 28° C., below about 25° C., below about 20° C., below about 15° C., or below about 10° C., below about 5° C., below about 2° C., etc. and/or above about 0° C., above about 2° C., above about 5° C., above about 10° C., or above about 15° C., etc.) after or near completion of the reaction and/or binding process. In some embodiments, a suitable maintenance temperature can improve, enhance, and/or maintain the stability, longevity, and/or composition (i.e., avoiding, reducing, and/or inhibiting decomposition) of the reaction product and/or fermentation product-bound carrier.

In addition, in one or more embodiments, the aforementioned parameters (e.g., mixing, applying, air, temperature, etc.) can cause and/or enhance binding of the fermentation product to the carrier. For instance, the parameters can cause and/or enhance adsorption of the fermentation product to the surface of the carrier, absorption of the fermentation product below the surface of the carrier, and/or drying of the fermentation product on or in the carrier. Thus, the fermentation product can be or become dry-bound to the carrier in some embodiments.

In at least one embodiment, the method can also include maintaining the fermentation product-bound carrier at a suitable reaction pH between about 2-10, preferably between about 2-8, more preferably between about 2-6, still more preferably between about 2-5, still more preferably between about 2-4, still more preferably between about 2-3, still more preferably between about 3-10, still more preferably between about 3-8, still more preferably between about 3-6, still more preferably between about 3-5, still more preferably between about 3-4, still more preferably between about 4-10, still more preferably between about 4-8, still more preferably between about 4-6, still more preferably between about 4-5, etc.) during the reaction and/or binding process. In some embodiments, the suitable pH can ensure and/or enhance the chemical reaction. The method can also include maintaining the fermentation product-bound carrier at a suitable maintenance pH between about 2-10, preferably between about 2-8, more preferably between about 2-6, still more preferably between about 2-5, still more preferably between about 2-4, still more preferably between about 2-3, still more preferably between about 3-10, still more preferably between about 3-8, still more preferably between about 3-6, still more preferably between about 3-5, still more preferably between about 3-4, still more preferably between about 4-10, still more preferably between about 4-8, still more preferably between about 4-6, still more preferably between about 4-5, etc.) after or near completion of the reaction and/or binding process. In some embodiments, the suitable maintenance pH can improve, enhance, and/or maintain the stability, longevity, and/or composition (i.e., avoiding, reducing, and/or inhibiting decomposition) of the reaction product and/or fermentation product-bound carrier. In addition, the suitable maintenance pH can inhibit microbial contamination and/or growth on or in the product (e.g., especially at lower pH). In at least one embodiment, the reaction can have a pH lowering effect (e.g., on the carrier and/or mixture of carrier and fermentation product).

Some embodiments include mixing (e.g., as described above or otherwise mixing) one or more vitamins and/or minerals with the fermentation product-bound carrier (or fermentation product-applied carrier). As indicated above, one or more of the vitamins and/or minerals can be bound or chelated to at least one of the metabolites of the fermentation product (e.g., such that the bioavailability of the at least one of the metabolites is increased thereby). Vitamins and/or minerals can also enhance the nutritional value of the product. Embodiments can also include mixing (e.g., as described above or otherwise mixing) the fermentation product-bound carrier with one or more additional components (e.g., plant extracts, etc.), as described herein.

Some embodiments include a method of manufacturing a soil treatment product or plant treatment product. The method can include mixing a plant fertilizer component with a microbial fermentation product to form a combination soil treatment product or plant treatment product. In some embodiments, a plant fertilizer component is mixed with liquid a microbial fermentation product in a tank mix prior to product distribution. In one or more additional or alternative embodiments, a plant fertilizer component and a liquid microbial fermentation product are co-formulated. Additional ingredients may be mixed with the plant fertilizer component and microbial fermentation product. Additional ingredients may include stabilizers, emulsifiers, and/or water or organic mineral oil base. In some embodiments, plant fertilizer component is mixed with a dry or substantially dry microbial fermentation product (or fermentation product-bound carrier). The plant fertilizer component and microbial fermentation product may be milled to the same or substantially the same particle size. The soil treatment product or plant treatment product resulting from the mixing of the plant fertilizer component with the microbial fermentation product may be water soluble, forming a stable suspension in water. Embodiments can also include packaging the soil treatment product or plant treatment product.

It will be appreciated that certain embodiments of the present disclosure can include a method of enhancing the health of crops. The method can include applying an effective amount of a soil treatment product or plant treatment product to soil (in which a plant is grown) and/or to a plant so as to improve one or more health indicators of the plant or plant population (e.g., as compared to a control). The one or more health indicators can be selected from the group consisting of wilting, coloration, yield, size and/or weight, life span and/or mortality, overall health and appearance, and so forth. The step of applying can comprise spraying and/or distributing (a mixture of) the plant fertilizer component and the microbial fermentation product to the soil and/or on or near the plant, such that the bio-availability of phosphorus in the soil and/or fertilizer is enhanced and/or such that the plant uptakes an increased amount of the phosphorus. The plant fertilizer component and microbial fermentation product can be applied separately or in combination.

In some embodiments, a method includes applying an effective amount of a soil treatment product or plant treatment product to a seed (e.g., a group of seeds intended for sowing) so as to improve one or more health indicators of the germinating seed and/or later-germinated plant or plant population (e.g., as compared to a control). The one or more health indicators can be selected from the group consisting of stronger germination, wilting, coloration, yield, size and/or weight, life span and/or mortality, overall health and appearance, and so forth.

The step of applying can comprise spraying and/or distributing a soil treatment product or plant treatment product (e.g., comprising a mixture of the plant fertilizer component and microbial fermentation product) on or near a plant (e.g., on the soil), such that the plant uptakes an effective amount of the soil treatment product or plant treatment product, or component thereof (e.g., phosphorus) from the soil. The plant fertilizer component and microbial fermentation product can also be applying separately. Soil fertilization using the disclosed soil treatment product or plant treatment product can be performed prior to planting, prior to germination, after germination, and anytime during the life of the plant.

In some embodiments, the plant fertilizer product and microbial fermentation product can be co-applied to soil, seed, or plant. In certain embodiments, the co-application can occur simultaneously, such as by mixing or combining the plant treatment fertilizer and microbial fermentation product, as described herein. In some embodiments, the co-application can occur sequentially or separately. Sequential or separate application may occur or be separated by any suitable period of time.

Additional features and advantages of illustrative embodiments of the present disclosure will be set forth in the description which follows, and in part will be obvious from the description, or may be learned by the practice of such illustrative embodiments. The features and advantages of such embodiments may be realized and obtained by means of the instruments and combinations particularly pointed out in the appended claims. These and other features will become more fully apparent from the following description and appended claims, or may be learned by the practice of such illustrative embodiments as set forth hereinafter.

Illustrative Experimental Results

Effect of microbial fermentation product on solubility of phosphorus in the soil Two growth chamber corn experiments (corn experiments conducted in growth chamber) were conducted with microbial fermentation product to test its effects on phosphorus availability (e.g., bio-availability or solubility) in the soil with and without NPK fertilizer application. Treatments included 1) Untreated soil, 2) Soil treated with microbial fermentation product alone, 3) Soil treated with fertilizer alone, and 4) Soil treated with a mix of fertilizer and microbial fermentation product. Corn was planted in pots containing approximately one kg of soil. Microbial fermentation product was applied to the soil at the rate of 0.1 ml of product diluted in 100 ml of water per pot. Fertilizer 15-15-15 of N—$P_2O_5$—$K_2O$ was applied at approximately one inch to the side of the seed and one inch below the soil surface at 0.5 g per pot. Microbial fermentation product was applied to fertilizer treatment at 0.1 ml to 0.5 g of fertilizer. Pots were watered initially with 100 ml followed by 100 to 200 ml of water per pot every 2-4 days. Water soluble phosphorus was analyzed using ICP-OES method.

The results with averages for two experiments and four replications for each experiment are shown in Tables 1 and 2. Microbial fermentation product increased soluble phosphorus in the soil by 11.6% compared to untreated soil. Microbial fermentation product increased soluble phosphorus in the soil treated with N—$P_2O_5$—$K_2O$ fertilizer by 16.6% compared to soil treated with fertilizer only.

TABLE 1

Effect of microbial fermentation product applied to soil on solubility of phosphorus in the soil.

| Treatment | Soluble phosphorus (ppm) | Standard deviation | Difference (%) |
|---|---|---|---|
| Soil only control | 0.585 | 0.0125 | — |
| Soil with Microbial fermentation product | 0.653 | 0.0319 | 11.6 |

TABLE 2

Effect of microbial fermentation product applied to fertilizer and mixed with soil on soluble phosphorus in the soil.

| Treatment | Soluble phosphorus (ppm) | Standard deviation | Difference (%) |
|---|---|---|---|
| Soil with Fertilizer control | 0.723 | 0.0499 | — |
| Soil and Fertilizer with Microbial fermentation product | 0.843 | 0.0505 | 16.6 |

Field corn experiment was conducted with microbial fermentation product to test its effects on phosphorus availability (e.g., bio-availability or solubility) in the soil and crop productivity with two rates of NPK fertilizer application. Treatments included 1) standard application of NPK, 2) standard application of NPK plus/treated with microbial fermentation product, 3) reduced application (25% reduction) of NPK, and 4) reduced application (25% reduction) of NPK plus/treated with microbial fermentation product.

The standard NPK fertilizer application/rate consisted of 168 kg N/ha, 112 kg $P_2O_5$/ha and 112 kg $K_2O$/ha. The 25% reduced NPK fertilizer application/rate consisted of 126 kg N/ha, 84 kg $P_2O_5$/ha and 84 kg $K_2O$/ha. The microbial fermentation product, where applied, was applied at a rate of 2 liters per 1000 kg of fertilizer and mixed until thorough coating of a fertilizer was obtained. The above specified fertilizer treatments were applied over rows of corn at V1 stage. Corn was planted at a seeding rate of 88,920 seeds/ha in 76 cm row spacing. Each plot was 9 m long and 3 m wide. The study design was Randomized Block with four replications. Plots were irrigated at 3.8 cm each week during the season. Cultural procedures followed local practices and were the same for all plots. Soil samples were collected two weeks after crop emergence and analyzed for water soluble phosphorus using standard soil testing method. Corn was harvested using small research plot combine when the corn grain reached 25% moisture content.

The results with averages of four replications are shown in Tables 3 and 4.

TABLE 3

Effect of microbial fermentation product applied to the NPK fertilizer on the solubility of phosphorus in the soil.

| Treatment | Soluble phosphorus (ppm) | Difference (%) |
|---|---|---|
| Standard NPK Application | 9.0 | — |
| Standard NPK Application with microbial fermentation product | 22.7 | 152% |
| 25% Reduced NPK Application | 18.2 | — |
| 25% Reduced NPK Application with microbial fermentation product | 26.2 | 44% |

Microbial fermentation product applied to standard NPK fertilizer application increased soluble phosphorus in the soil by 152% compared to the soil treated with standard application of NPK fertilizer alone. Microbial fermentation product applied to 25% reduced NPK fertilizer application increased soluble phosphorus in the soil by 44% compared to the soil treated with the 25% reduced application of NPK fertilizer alone.

TABLE 4

Effect of microbial fermentation product applied to fertilizer on the yield of corn.

| Treatment | Yield (kg/ha) | Difference (%) |
|---|---|---|
| Standard NPK Application | 4,911 | — |
| Standard NPK Application with microbial fermentation product | 4,994 | 1.7% |
| 25% Reduced NPK Application | 5,130 | — |
| 25% Reduced NPK Application with microbial fermentation product | 5,941 | 15.8% |

Microbial fermentation product increased yield by 1.7% when applied to 100% NPK fertilizer rate and by 15.8% at 75% fertilizer rate.

CONCLUSION

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

Disclosure of certain features relative to a specific embodiment of the present disclosure should not be construed as limiting application or inclusion of said features to the specific embodiment. Rather, it will be appreciated that other embodiments can also include said feature without necessarily departing from the scope of the present disclosure. In particular, products and/or methods according to certain embodiments of the present disclosure may include, incorporate, or otherwise comprise properties, features (e.g., ingredients, components, members, elements, parts, and/or portions), steps, etc. described in other embodiments disclosed and/or described herein. Accordingly, the various features of certain embodiments can be compatible with, combined with, included in, and/or incorporated into other embodiments of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

What is claimed is:

1. A plant or soil treatment product, comprising:
   a granular fertilizer component comprising phosphorus; and
   a microbial fermentation component adsorbed to a surface of the fertilizer component and/or absorbed below the surface of the fertilizer component, the microbial fermentation component comprising a whole culture lysate of a bacterial fermentation culture, the whole culture lysate comprising:
   lysed cells;
   liquid fermentation medium; and
   fermentation metabolites,
   wherein less than about 5% of microbial biomass of the microbial fermentation component comprises living or viable microorganisms.

2. The product of claim 1, wherein the microbial fermentation component is substantially devoid of living microorganisms.

3. The product of claim 1, wherein the lysed cells comprise lysed lactic acid bacteria.

4. The product of claim 1, wherein the fermentation metabolites comprise lactic acid bacteria fermentation metabolites.

5. The product of claim 1, wherein the fertilizer component comprises a nitrogen-phosphorus-potassium (NPK) fertilizer.

6. The product of claim 1, wherein the fertilizer component is substantially devoid of urea.

7. The product of claim 1 further comprising one or more additives selected from the group consisting of amino acids, peptides, hydrolyzed proteins, organic acids, carboxylic acids, carbohydrates, plant extracts, lignosulfonates, humic acids, fulvic acids, macro-nutrients, secondary-nutrients, micro-nutrients, chelated minerals, complex minerals, vitamins, wetting agents, dispersants, and surfactants.

8. The product of claim 1, further comprising a mixture of amino acids, minerals, and organic acids.

9. The product of claim 1, wherein the product has a moisture content between about 0.25% and about 25%.

10. A method of treating soil or a plant, or of increasing an amount or level of soluble phosphorus in soil, or of solubilizing phosphorus in soil, or of increasing the bioavailability of phosphorus in soil, the method comprising applying to the soil or the plant the product of claim 1.

11. A method of manufacturing the product of claim 1, the method comprising applying the microbial fermentation component in liquid form directly to the granular fertilizer component such that the microbial fermentation component is adsorbed to a surface of the fertilizer component and/or absorbed below the surface of the fertilizer component.

12. A method of solubilizing phosphorus in a plant growth medium, the method comprising applying a treatment product to the plant growth medium, the treatment product comprising:
   a granular fertilizer component comprising phosphorus; and
   a microbial fermentation component adsorbed to a surface of the granular fertilizer component and/or absorbed below the surface of the granular fertilizer component, the microbial fermentation component comprising a whole culture lysate of a microbial fermentation culture, the whole culture lysate comprising:
   lysed cells;
   liquid fermentation medium; and
   fermentation metabolites,
   wherein less than about 5% of microbial biomass of the microbial fermentation component comprises living or viable microorganisms,
   wherein the treatment product has a moisture content between about 0.25% and about 25%, and
   wherein the treatment product increases soluble phosphorus levels in the plant growth medium as compared to plant growth medium in which the granular fertilizer component has been applied without the microbial fermentation component adsorbed to a surface thereof and/or absorbed below the surface thereof.

13. The method of claim 12, wherein the microbial fermentation component is substantially devoid of living microorganisms.

14. The method of claim 12, wherein the lysed cells comprise lysed lactic acid bacteria and the fermentation metabolites comprise lactic acid bacteria fermentation metabolites.

15. The method of claim 12, wherein the granular fertilizer component comprises a nitrogen-phosphorus-potassium (NPK) fertilizer.

16. The method of claim 12, wherein the granular fertilizer component is substantially devoid of urea.

17. The method of claim 12, wherein the treatment product further comprises one or more additives selected from the group consisting of amino acids, peptides, hydrolyzed proteins, organic acids, carboxylic acids, carbohydrates, plant extracts, lignosulfonates, humic acids, fulvic acids, macro-nutrients, secondary-nutrients, micro-nutrients, chelated minerals, complex minerals, vitamins, wetting agents, dispersants, and surfactants.

18. The method of claim 12, wherein the treatment product further comprises a mixture of amino acids, minerals, and organic acids.

19. A plant or soil treatment product, comprising:
a solid fertilizer component comprising phosphorus; and
a microbial fermentation component adsorbed to a surface of the fertilizer component and/or absorbed below the surface of the fertilizer component, the microbial fermentation component comprising:
  lysed microorganisms;
  liquid fermentation medium; and
  fermentation metabolites,
wherein less than about 5% of microbial biomass of the microbial fermentation component comprises living or viable microorganisms.

20. The product of claim 19, wherein:
the lysed microorganisms comprise lysed bacteria and the fermentation metabolites comprise lactic acid bacteria fermentation metabolites; and
the treatment product has a moisture content between about 0.25% and about 25%.

* * * * *